United States Patent
Shin et al.

(10) Patent No.: US 9,207,782 B2
(45) Date of Patent: Dec. 8, 2015

(54) REMOTE CONTROLLER, REMOTE CONTROLLING METHOD AND DISPLAY SYSTEM HAVING THE SAME

(75) Inventors: Duckmoon Shin, Gyeonggi-Do (KR); Taeho Kim, Seoul (KR); Miae Lee, Gyeonggi-Do (KR); Sungin Jung, Gyeonggi-Do (KR); Wooyoung Kwak, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 1107 days.

(21) Appl. No.: 12/970,434

(22) Filed: Dec. 16, 2010

(65) Prior Publication Data
US 2012/0154276 A1 Jun. 21, 2012

(51) Int. Cl.
*G06F 3/033* (2013.01)
*G09G 5/08* (2006.01)
*G06F 3/0346* (2013.01)
*G06F 3/01* (2006.01)

(52) U.S. Cl.
CPC .............. *G06F 3/0346* (2013.01); *G06F 3/017* (2013.01); *G08C 2201/32* (2013.01)

(58) Field of Classification Search
CPC ............ G06F 2203/0381; G06F 3/017; G06F 3/0346; G08C 2201/32
See application file for complete search history.

(56) References Cited

U.S. PATENT DOCUMENTS

| 7,280,096 B2 * | 10/2007 | Marvit et al. ................. 345/156 |
| 2007/0080940 A1 | 4/2007 | Aoki et al. |
| 2008/0048980 A1 * | 2/2008 | Love et al. ..................... 345/158 |
| 2008/0297484 A1 * | 12/2008 | Park et al. ...................... 345/173 |
| 2009/0066647 A1 * | 3/2009 | Kerr et al. ...................... 345/158 |
| 2010/0137042 A1 * | 6/2010 | Na et al. ..................... 455/575.5 |

FOREIGN PATENT DOCUMENTS

| KR | 10-2004-0006855 A | 1/2004 |
| KR | 10-2006-0098806 A | 9/2006 |
| KR | 10-2007-0028794 A | 3/2007 |
| KR | 2007-104567 A | 4/2007 |

* cited by examiner

Primary Examiner — Insa Sadio
(74) Attorney, Agent, or Firm — Birch, Stewart, Kolasch & Birch, LLP (57) ABSTRACT

Disclosed are a remote controller, a remote controlling method, and a display system having the same. An image displayed on a display apparatus may be converted by using one remote controller. The display system may perform a converting the image by using one remote controller, without implementing a touch screen on the display apparatus or using two or more remote controllers for multi-touch. This may enhance a user's convenience and reduce fabrication costs.

9 Claims, 7 Drawing Sheets

REMOTE CONTROLLER, REMOTE CONTROLLING METHOD AND DISPLAY SYSTEM HAVING THE SAME

TECHNICAL FIELD

The present invention relates to a remote controller and a remote controlling method, and more particularly, to a remote controller capable of detecting a remote controlling motion and controlling a display apparatus based on the detected motion, and a remote controlling method using the same.

BACKGROUND ART

Home electronic appliances or electronic apparatuses being currently presented on the market absolutely include a remote controller. The remote controller adopts an infrared communication method having simple implementations and low costs except for a wireless mouse or a keyboard. This remote controller is provided with additional buttons for performing motions of home electronic appliances or electronic apparatuses. A user has to search for a corresponding button for performing a desired motion, and has to locate the remote controller towards a corresponding home electronic appliance or electronic apparatus.

The conventional home electronic appliances or electronic apparatuses are being developed into an integrated type having integrated functions. One of the integrated type home electronic appliances or electronic apparatuses is a smart television. This smart television is being developed to implement various contents in the conventional TV function.

When implementing map contents, photos, web pages and menu icons through this smart television, converting the image, i.e., enlargements and reduces of images are required. However, it is not preferable to apply a touch screen due to characteristics of a television. Furthermore, using two remote controllers is not efficient in the aspect of costs and a user's convenience.

DISCLOSURE OF THE INVENTION

Therefore, it is an object of the present invention to provide a remote controller capable of performing a converting the image displayed on a display apparatus, and a remote controlling method using the same.

It is another object of the present invention to provide a display system having a display apparatus which displays various contents, the display system capable of performing a converting the image by using one remote controller, without implementing a touch screen on the display apparatus or using two or more remote controllers for multi-touch.

To achieve these and other advantages and in accordance with the purpose of the present invention, as embodied and broadly described herein, there is provided a remote controller which remote-controls an external display apparatus, comprising: a motion detection unit having one or more sensors and the motion detection unit configured to detect a motion of the remote controller; a control unit configured to generate a control signal for converting an image displayed on the display apparatus based on the motion of the remote controller detected by the motion detection unit, wherein the converting the image is zooming or rotating of the image; and a communication unit configured to transmit the control signal to the display apparatus.

The remote controller according to the present invention may further comprise a storage unit configured to store driving programs for the remote controller, and control commands for a converting the image in correspondence to a motion of the remote controller. The control unit may extract a control command corresponding to the motion detected by the motion detection unit among the control commands stored in the storage unit, and may generate a control signal including the extracted control command.

The remote controller according to the present invention may further comprise an input unit configured to directly receive a control command for controlling the display apparatus and the image from a user.

The input unit may comprise a mode conversion button configured to allow the remote controller to enter an image conversion mode for performing a converting the image.

The remote controller may enter an image conversion mode or return to a previous mode by detecting a pressed state of the mode conversion button.

The control unit may be configured to generate a control signal when the mode conversion button is in a pressed state, and to transmit the control signal to the display apparatus through the communication unit.

The control unit may be configured to generate a control signal when the remote controller in a preset posture is moved, and to transmit the control signal to the display apparatus through the communication unit.

The motion detection unit may include at least one of one or more gyro sensors for detecting rotation of the remote controller, and one or more acceleration sensors for detecting acceleration of the remote controller.

The control unit may perform a converting the image by using at least one of a speed, a distance and a direction of the remote controller. The control unit may determine a range of a a converting the image based on at least one of a speed, a distance and a direction of the remote controller.

The motion detection unit may repeatedly detect a motion of the remote controller, and the control unit may perform a converting the image based on the detected motion and the number of times.

The converting the image may further include at least one of enlargement, reduction, and rotation of the image based on a center point of the image, moving the center point, and scroll or drag of the image.

The motion detection unit may include at least one of one or more gyro sensors, one or more acceleration sensors, one or more terrestrial magnetic sensors, and one or more distance sensors. And, the motion detection unit may detect a three-dimensional motion of the remote controller by combining at least one or two of the gyro sensor, the acceleration sensor, the terrestrial magnetic sensor and the distance sensor with each other.

To achieve these and other advantages and in accordance with the purpose of the present invention, as embodied and broadly described herein, there is also provided a remote controlling method for remote-controlling an external display apparatus by using a remote controller, the method comprising: detecting a motion of the remote controller by the remote controller; generating a control signal for converting an image displayed on the display apparatus based on the motion of the remote controller detected by the motion detection unit, wherein the converting the image is zooming or rotating of the image; and transmitting the control signal to the display apparatus.

The method may further comprise converting a current mode into an image conversion mode for performing a converting the image. The converting a current mode into an image conversion mode may comprise detecting a pressed state of a mode conversion button provided at the remote controller, and entering the image conversion mode or returning to a previous mode when the mode conversion button is in a pressed state.

The generating a control signal may be performed when the mode conversion button is in a pressed state.

The converting a current mode into an image conversion mode may comprise determining whether the remote controller in a preset posture is moved. When the remote controller in a preset posture is moved, the current mode may be converted into the image conversion mode.

The converting a current mode into an image conversion mode may comprise generating a control signal to display directions of the converting the image on the display apparatus, and transmitting the control signal to the display apparatus. The converting a current mode into an image conversion mode may comprise generating the control signal to display a center point of the converting the image on the display apparatus, and transmitting the control signal to the display apparatus.

The remote controlling method may further comprise storing control commands for a converting the image in correspondence to the motion of the remote controller.

The generating a control signal may comprise extracting a control command corresponding to the detected motion among the control commands for a converting the image, and generating a control signal including the extracted control command.

The remote controlling method according to the present invention may further comprise performing a converting the image based on the control signal by the display apparatus. The performing a converting the image may comprise detecting information on a speed, a distance and a direction of the remote controller from a detected motion, and determining a range of the conversions based on at least one of the speed, the distance and the direction.

In the detecting a motion, a three-dimensional motion of the remote controller may be detected by combining at least one or two of a gyro sensor, an acceleration sensor, a terrestrial magnetic sensor and a distance sensor with each other.

To achieve these and other advantages and in accordance with the purpose of the present invention, as embodied and broadly described herein, there is still also provided a display system, comprising: a remote controller configured to detect its own motion, and to generate a control signal corresponding to the detected motion and a display apparatus configured to convert an image displayed on a screen based on the control signal, wherein the converting the image is zooming or rotating of the image.

The remote controller may comprise a motion detection unit provided with at least one of one or more gyro sensors for detecting rotation of the remote controller, one or more acceleration sensors for detecting acceleration of the remote controller, one or more terrestrial magnetic sensors, and one or more distance sensors, and the motion detection unit configured to detect a motion of the remote controller, a control unit configured to generate a control signal for converting an image displayed on the display apparatus in correspondence to the motion detected by the motion detection unit, and a communication unit configured to transmit the control signal to the display apparatus.

The remote controller according to the present invention may further comprise a storage unit configured to store driving programs and control commands for a converting the image in correspondence to a motion of the remote controller. The control unit may extract a control command corresponding to the motion detected by the motion detection unit among the control commands stored in the storage unit, and may generate a control signal including the extracted control command.

The remote controller according to the present invention may further comprise a mode conversion button configured to allow the remote controller to enter an image conversion mode for performing a converting the image.

The remote controller may enter an image conversion mode or return to a previous mode by detecting a pressed state of the mode conversion button.

The remote controller according to the present invention may further comprise a storage unit configured to store driving programs, and control commands for a converting the image in correspondence to a motion of the remote controller. The control unit may extract a control command corresponding to the motion detected by the motion detection unit among the control commands stored in the storage unit, and may generate a control signal including the extracted control command.

The remote controller according to the present invention may further comprise a mode conversion button configured to allow the remote controller to enter an image conversion mode for performing a converting the image.

The remote controller may enter an image conversion mode or return to a previous mode by detecting a pressed state of the mode conversion button.

The control unit may be configured to generate a control signal when the mode conversion button is in a pressed state, and to transmit the control signal to the display apparatus.

The control unit may be configured to generate a control signal when the remote controller in a preset posture is moved, and to transmit the control signal to the display apparatus.

The display apparatus may extract a control command from the control signal, and may display a center point or a direction of the converting the image according to the control command, or may display the center point and the direction together.

The display apparatus may extract a control command from the control signal, convert the image according to the control command, and display the converted image.

The present invention may have the following advantages.

Firstly, an image displayed on the display apparatus may be converted by using one remote controller.

Secondly, the display system may be capable of performing a converting the image by using one remote controller, without implementing a touch screen on the display apparatus or using two or more remote controllers for multi-touch. This may enhance a user's convenience and reduce fabrication costs.

MODES FOR CARRYING OUT THE PREFERRED EMBODIMENTS

Reference will now be made in detail to the preferred embodiments of the present invention, examples of which are illustrated in the accompanying drawings.

Hereinafter, a remote controller, a remote controlling method, and a display system having the same according to the present invention will be explained in more detail.

Figure 1:
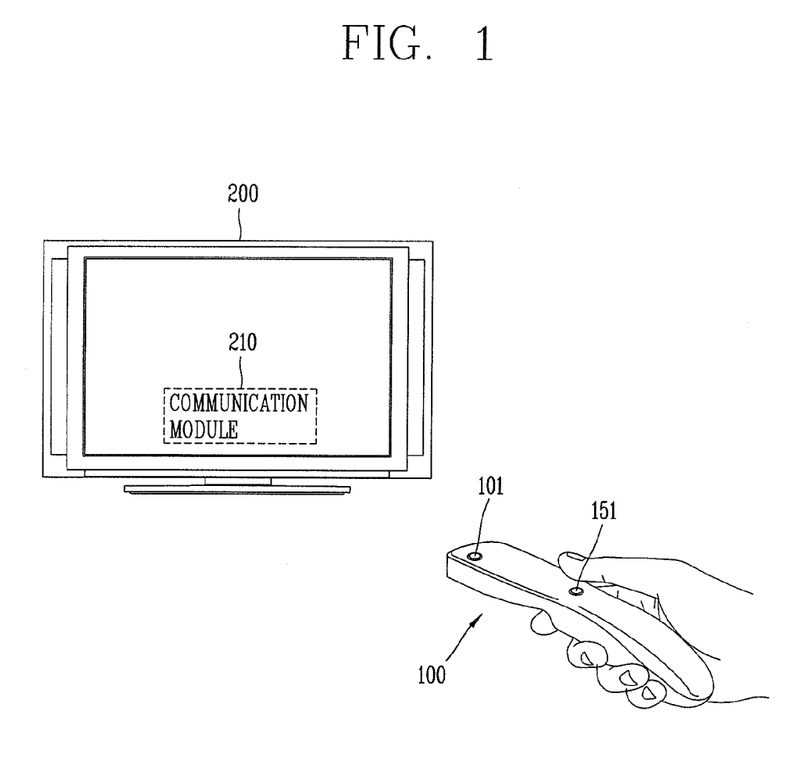
FIG. 1 is a view schematically showing a configuration of a display system according to the present invention.

Referring to FIG. 1, a display system according to the present invention comprises a remote controller 100 configured to detect its own motion, and to generate a control signal corresponding to the detected motion, and a display apparatus 200 configured to convert an image displayed on a screen based on the control signal, wherein the converting the image is zooming or rotating of the image.

Figure 2:
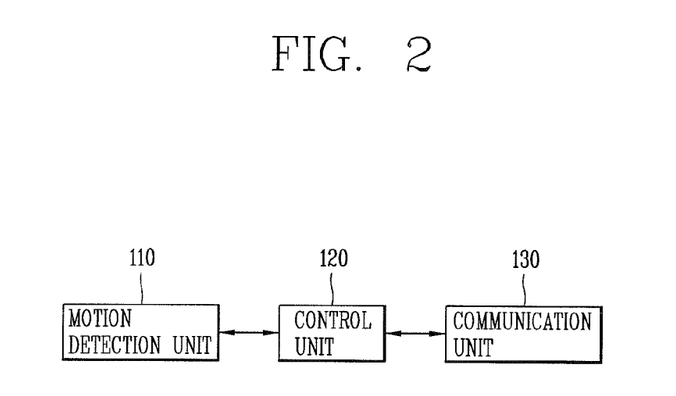
FIGS. 2 and 3 are block diagrams schematically showing a configuration of a remote controller according to the present invention.

Referring to FIG. 2, the remote controller 100 comprises a motion detection unit 110 configured to detect a motion of the remote controller 100, a control unit 120 configured to generate a control signal for converting an image displayed on the display apparatus 200 in correspondence to the motion detected by the motion detection unit, and a communication unit 130 configured to transmit the control signal to the display apparatus.

The display apparatus 200 is implemented as a smart television which can implement map contents, photos, web pages and menu icons, for instance. The display apparatus 200 performs a motion such as multi-touch according to the control signal. That is, the display apparatus 200 displays an image on a screen, reads a control command included in a control signal transmitted from the remote controller 100, and performs converting the image according to the control command.

Figure 3:
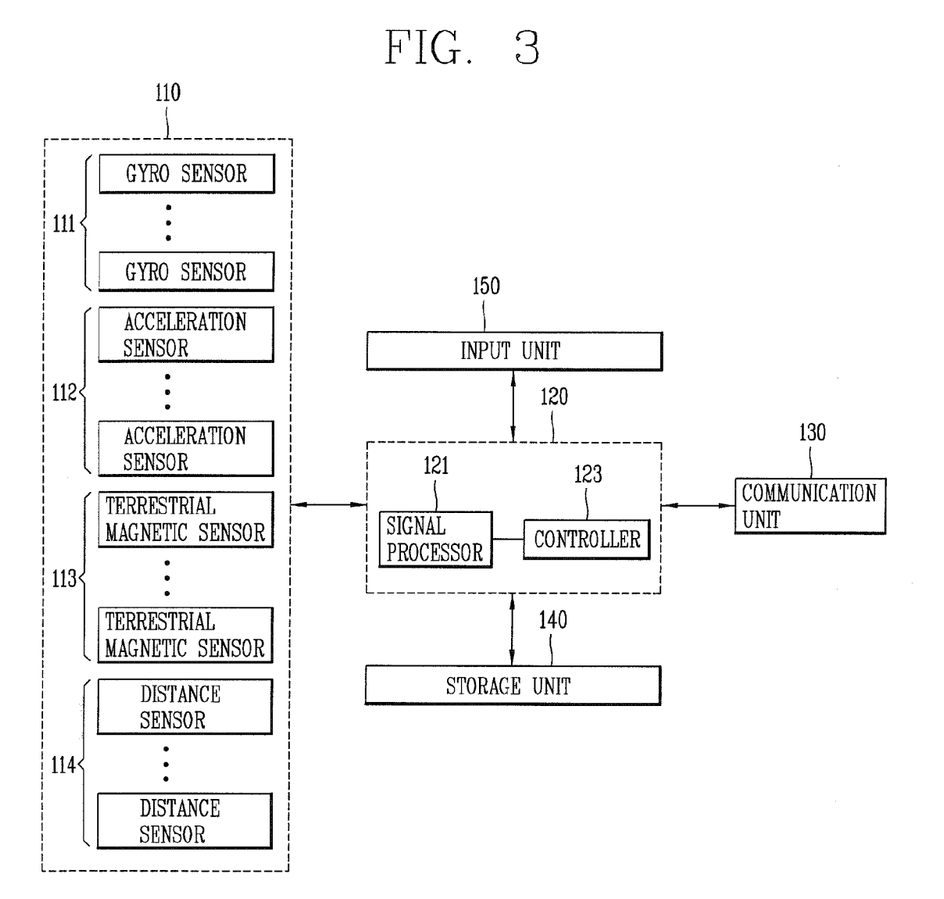

Referring to FIG. 3, the motion detection unit 110 includes at least one of one or more gyro sensors 111 for detecting rotation of the remote controller 100, one or more acceleration sensors 112 for detecting acceleration of the remote controller 100, one or more terrestrial magnetic sensors 113, and one or more distance sensors 114. And, the motion detection unit 110 detects a three-dimensional motion of the remote controller by combining at least one or two of the gyro sensor, the acceleration sensor, the terrestrial magnetic sensor and the distance sensor with each other.

The gyro sensor 111 is a type of angular speed sensor, which measures a rotation amount of the remote controller with an acceleration with respect to an axis. That is, when the remote controller 100 does not move or move with the same speed, a detected value of the gyro sensor 111 is '0'. Generally, the remote controller 100 comprises one gyro sensor 111 in a vertical direction and a horizontal direction, respectively.

The acceleration sensor 112 measures an acceleration with respect to a gravitation (gravitational acceleration), a tilted degree with respect to the ground. More concretely, the more the remote controller 100 is tilted with respect to the ground, the larger the detected value of the acceleration sensor 112 is. Generally, the remote controller 100 detects motions in upper, lower, right and left directions by perpendicularly mounting a two-axis acceleration sensor on the ground. Here, the remote controller may be configured to detect an acceleration in each direction by using two or more one-axis acceleration sensors, or may be configured to detect an acceleration in a direction perpendicular to a screen of the display apparatus by using a three-axis acceleration sensor.

The remote controller 100 generates a control signal for converting an image displayed on the display apparatus 200. For instance, the remote controller 100 performs a zoom-in or zoom-out command with respect to the image. As explained later, when the remote controller is in a preset posture, or when a specific button is pressed, or when a specific motion is detected, the remote controller 100 is ready to perform a zoom-in or zoom-out command with respect to the image. If the display apparatus cannot perform a control motion on a screen unlike a smart television, an image has to be converted according to a motion of the remote controller. The remote controller 100 of the present invention performs the same motion as a motion to perform multi-touch on the display apparatus.

The remote controller 100 enters an image conversion mode for performing a zoom-in or zoom-out function with respect to an image, and then detects other motions. That is, the remote controller 100 detects a motion for performing a zoom in or zoom-out function with respect to an image. For instance, an image displayed on the display apparatus 200 is zoomed-in or zoomed-out by performing a motion to shake in right and left directions, a motion to shake in upper and lower directions, a motion to move in back and forth directions, a motion to rotate in right and left directions, etc.

The zoom-in or zoom-out corresponds to enlargement or reduction of an image on the basis of a specific position of the image. Accordingly, a center point and a range have to be determined. This will be explained in more detail in contrast to multi-touch. A position of a center point is determined by multi-touch points, and a range of enlargement or reduction is determined by a range of a single multi-touch or the number of times that multi-touch is performed. The center point of the remote controller 100 of the present invention has a different position according to a motion to enter a zoom-in mode or a zoom-out mode. For instance, when the remote controller 100 points a specific position, the pointed position corresponds to the center point. In other words, the center point can be a cursor point. Alternatively, when the remote controller is in a specific posture, a center point of a screen corresponds to a center point of conversion.

A range to zoom-in or zoom-out the image, i.e., a range to enlarge or reduce the image may be preset according to a degree to shake the remote controller 100 in right and left directions or in upper and lower directions, to move the remote controller 100 in back and forth directions, to rotate the remote controller 100 in right and left directions. And, the remote controller 100 detects at least one of a speed, a distance and a direction thereof, determines whether to perform general control or minute control based on the detected information, and determines a range to enlarge or reduce the image. Here, a unit range corresponding to the speed, the distance and the direction may be preset. Also, the remote controller 100 may control the range by repeating the motions.

Referring to FIG. 3, the remote controller 100 according to the present invention further comprises a storage unit 140 configured to store driving programs, and control commands for a converting the image in correspondence to a motion of the remote controller. The control unit 120 extracts a control command corresponding to the motion detected by the motion detection unit 110 among the control commands stored in the storage unit 140, and generates a control signal including the extracted control command. The display apparatus 200 reads the control command from the control signal, and performs a motion corresponding to the control command. The remote controller 100 pre-stores, in the storage unit 140, control commands corresponding to conversions, e.g., a control command to enter a mode for performing a converting the image, a control command to perform the image conversions, and a control command to get out of the mode for performing a converting the image. Then, the remote controller 100 extracts, from the pre-stored control commands, a control command corresponding to a motion detected by the motion detection unit 110. Then, the remote controller 100 generates a control signal by using the extracted control command. For instance, in order to perform zoom-in or zoom-out an image displayed on the display apparatus 200 by the remote controller 100, the storage unit 140 pre-stores a control command for entering a mode to perform a zoom-in or zoom-out function, a control command corresponding to an enlargement or reduction range, search for a position of a center point, etc., a control command for getting out of the mode to perform a zoom-in or zoom-out function.

Referring to FIG. 3, the remote controller 100 according to the present invention further comprises an input unit 150 configured to directly receive a control command for controlling the display apparatus 200 and the image from a user. Referring to FIG. 1, the remote controller 100 comprises a power button 101 configured to turn on or off the display apparatus 200. The input unit 150 further comprises a mode conversion button 151 configured to allow the remote controller 100 to enter an image conversion mode for performing a converting the image.

The remote controller 100 enters the image conversion mode or returns to a previous mode by detecting a pressed state of the mode conversion button 151. More concretely, when the mode conversion button 151 is pressed by a user, the remote controller 100 generates a control signal to convert an image displayed on the display apparatus by the display apparatus. When the mode conversion button 151 is pressed again by the user, the remote controller 100 returns to a previous mode. When the mode conversion button 151 is pressed by a user, the remote controller 100 generates a control signal to enter an image conversion mode for performing a converting the image, e.g., a zoom-in or zoom-out function with respect to an image. On the other hand, when the mode conversion button 151 is pressed in the image conversion mode for performing a zoom-in or zoom-out function with respect to the image, the remote controller 100 generates a control signal to get out of the image conversion mode.

Once the motion detection unit 110 detects that the remote controller 100 has entered the image conversion mode, the control unit 120 generates a control signal to enter the image conversion mode, and the communication unit 130 transmits this generated control signal to the display apparatus. For instance, when the mode conversion button 151 is pressed in a normal mode, the control unit 120 generates a control signal to enter an image conversion mode for performing a zoom-in or zoom-out function with respect to an image. Here, the zoom-in or zoom-out corresponds to enlargement or reduction of an image on the basis of a specific position of the image. Accordingly, a center point and a range have to be determined. When the mode conversion button 151 is pressed, a point on a screen set by a posture, a position, etc. of the remote controller 100 is determined as a center point. Then, the motion detection unit 110 performs a zoom-in or zoom-out function with respect to an image. For instance, the motion detection unit 110 detects a motion to shake in right and left directions, a motion to shake in upper and lower directions, a motion to move in back and forth directions, a motion to rotate in right and left directions, etc. Based on the detected motion, the control unit 120 determines a range to zoom-in or zoom-out the image, i.e., an enlargement or reduction range. By using at least one of a speed, a distance and a direction of the remote controller detected by the motion detection unit 110, the control unit 120 determines whether to perform general control or minute control. Then, the control unit 120 determines a range to enlarge or reduce the image. Here, a unit range corresponding to the speed, the distance and the direction may be pre-stored in the storage unit 140. Also, the remote controller 100 may control the range by repeating the motions. When the mode conversion button 151 is pressed once more while the remote controller 100 performs a converting the image, i.e., performs a zoom-in or zoom-out function, the remote controller 100 returns to a normal mode from the image conversion mode.

The remote controller 100 may be configured to generate a control signal when the mode conversion button 151 is in a pressed state, and to transmit the control signal to the display apparatus 200. Here, the image can be converted only when the mode conversion button 151 is in a continuously pressed state. The remote controller 100 performs an image conversion process, e.g., a zoom-in or zoom-out function only when the mode conversion button 151 is pressed by a user. Once the user's finger or hand is detached from the mode conversion button, the remote controller 100 generates a control signal to get out of the image conversion mode. That is, differently from the aforementioned method to enter an image conversion mode when the mode conversion button is pressed once, and to return to a normal mode when the mode conversion button is pressed once more, the image can be converted only when the mode conversion button 151 is in a continuously pressed state.

Figure 4:
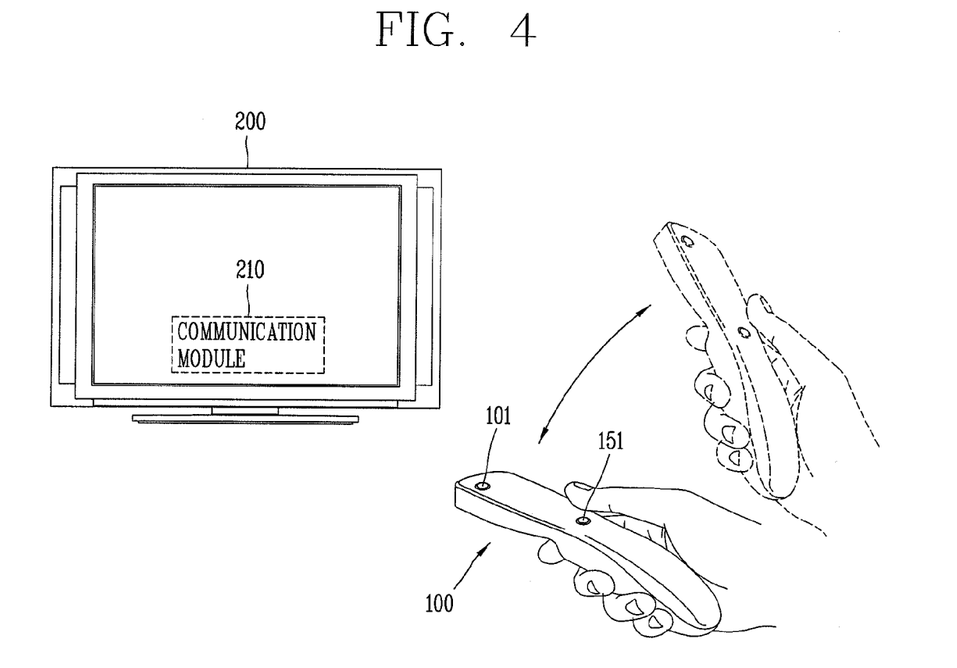
FIG. 4 is a view for explaining a motion to enter a mode to convert an image displayed on a display apparatus according to the present invention.

When the remote controller in a preset posture is moved, the remote controller 100 generates a control signal and transmits the control signal to the display apparatus 200. Referring to FIG. 4, when a user holds the remote controller 100 in an upright posture in a vertical direction, the remote controller 100 generates a control signal to perform a converting the image displayed on the display apparatus. When the remote controller 100 is held by the user in a preset posture, e.g., when the remote controller 100 is held by the user in an upright posture, the remote controller 100 generates a control signal to enter an image conversion mode for performing a converting the image, e.g., a zoom-in or zoom-out function with respect to an image. On the other hand, when the remote controller 100 is held by the user in a different posture or a previous posture, the remote controller 100 generates a control signal to get out of the image conversion mode.

Once the motion detection unit 110 detects that the remote controller 100 is in a preset posture, e.g., an upright posture, the control unit 120 generates a control signal to enter the image conversion mode, and the communication unit 130 transmits this generated control signal to the display apparatus. Here, the zoom-in or zoom-out corresponds to enlargement or reduction of an image on the basis of a specific position of the image. Accordingly, a center point and a range have to be determined. When the remote controller 100 is in a preset posture, a center point of a screen corresponds to a center point of conversion. Then, the motion detection unit 110 performs a zoom-in or zoom-out function with respect to an image. For instance, the motion detection unit 110 detects a motion to shake in right and left directions, a motion to shake in upper and lower directions, a motion to move in back and forth directions, a motion to rotate in right and left directions, etc. Based on the detected motion, the control unit 120 determines a range to zoom-in or zoom-out the image, i.e., an enlargement or reduction range. By using at least one of a speed, a distance and a direction of the remote controller detected by the motion detection unit 110, the control unit 120 determines whether to perform general control or minute control. Then, the control unit 120 determines a range to enlarge or reduce the image. Here, a unit range corresponding to the speed, the distance and the direction may be pre-stored in the storage unit 140. Also, the remote controller 100 may control the range by repeating the motions. When the remote controller 100 is in a different posture or a previous posture while performing a converting the image, e.g., a zoom-in or out function, the remote controller 100 returns to a normal mode from the image conversion mode.

Referring to FIG. 1, the display apparatus 200 comprises a communication module 210 configured to receive a control signal through a wired or wireless communication method with the communication unit 130 of the remote controller 100. The communication unit 130 of the remote controller 100 and the communication module 210 of the display apparatus 200 are connected to each other through wireless communications such as infrared rays and radio frequency (RF), or through wired communication lines.

Once the remote controller 100 transmits, to the display apparatus 200, a control signal to enter an image conversion mode for performing a converting the image, the display apparatus 200 reads a control command from the control signal, and displays a center point or a direction of the converting the image according to the control command, or displays the center point and the direction together.

Figure 5:
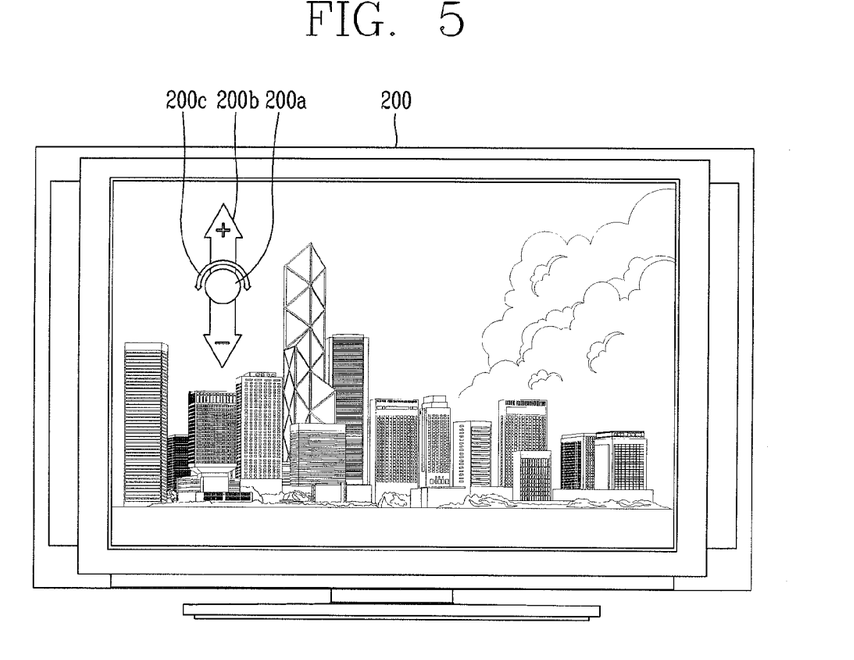
FIGS. 5 to 7 are views schematically showing a display screen for explaining a motion to perform a converting the image according to the present invention.
Figure 6:
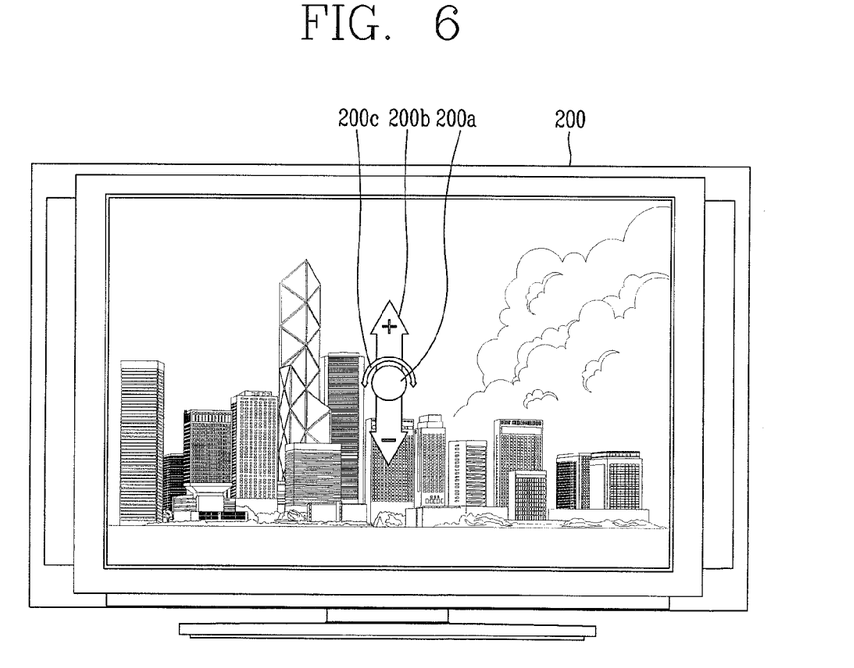
Figure 7:
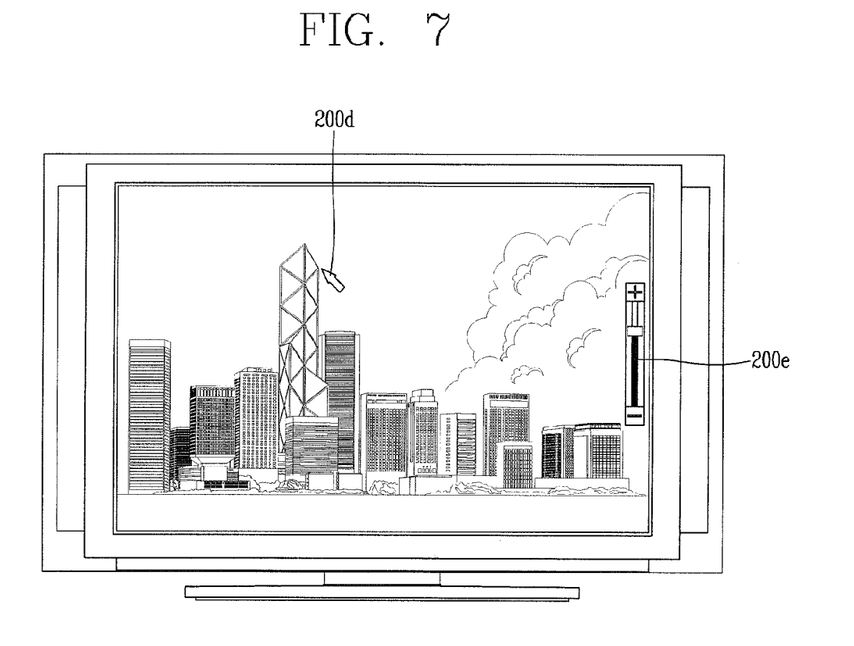

More concretely, when the display apparatus 200 enters an image conversion mode by a user or a control signal of the remote controller 100, the display apparatus 200 displays a center point for a converting the image on a screen. Referring to FIGS. 5 to 7, the center point 200a for a converting the image may be an arbitrary point, a center point of the screen, or a point where a cursor is located, etc.

In case of performing a converting the image by pressing the mode conversion button 151 provided at the remote controller 100 by a user or in a state that the mode conversion button 151 or other specific button has been pressed, the display apparatus 200 displays, on the screen, a point preset by a posture, a position, etc. of the remote controller 100 as a center point 200a as shown in FIG. 5.

When the remote controller 100 is held by a user in a preset posture, the display apparatus 200 displays a center point on the center of the screen as shown in FIG. 6. Here, the position of the center point corresponds to a position 200d of a cursor.

As shown in FIGS. 5 to 7, the display apparatus 200 further displays directions of enlargement, reduction and rotation (200b, 200c and 200e) on the screen by using an arrow, etc.

Then, the remote controller 100 generates a control signal including a control command for performing an image conversion, from a signal detected from the sensors mounted therein, and then transmits the generated control signal to the display apparatus 200. Then, the display apparatus 200 reads a control command from the control signal, converts the image according to the control command, and displays the converted image.

For instance, when the remote controller 100 moves upwardly or forwardly, the display apparatus 200 enlarges a displayed image. On the contrary, when the remote controller 100 moves downwardly or backwardly, the display apparatus 200 reduces a displayed image. As another example, when the remote controller 100 is tilted to the left or right side, the display apparatus 200 rotates a displayed image to the left or right side.

Figure 8:
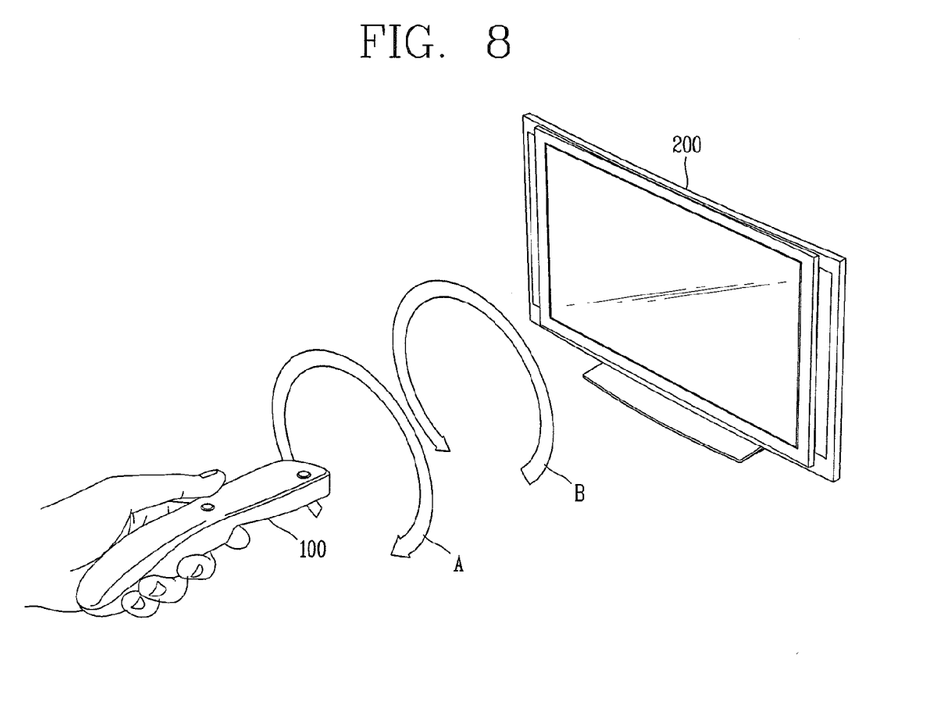
FIG. 8 is a view for explaining a motion to perform a converting the image according to the present invention.

When a user moves the remote controller, the user may have a limitation in moving his or her arm. In this case, as shown in FIG. 8, the user may move the remote controller 100 a plurality of times in a direction of 'A' or in a direction of 'B'.

Here, ranges of enlargement, reduction, and rotation may be set according to the number of repeated frequencies (times).

Referring to FIG. 2, the remote controller which remote-controls an external display apparatus comprises a motion detection unit 110 having one or more sensors and configured to detect a motion of the remote controller, a control unit 120 configured to generate a control signal for converting an image displayed on the display apparatus in correspondence to the motion detected by the motion detection unit, and a communication unit 130 configured to transmit the control signal to the display apparatus.

Referring to FIG. 3, the motion detection unit 110 includes at least one of one or more gyro sensors 111 for detecting rotation of the remote controller 100, one or more acceleration sensors 112 for detecting acceleration of the remote controller 100, one or more terrestrial magnetic sensors 113, and one or more distance sensors 114. And, the motion detection unit 110 detects a three-dimensional motion of the remote controller by combining at least one or two of the gyro sensor, the acceleration sensor, the terrestrial magnetic sensor and the distance sensor with each other.

The gyro sensor 111 is a type of angular speed sensor, which measures a rotation amount of the remote controller with an acceleration with respect to an axis. That is, when the remote controller 100 does not move or move with the same speed, a detected value of the gyro sensor 111 is '0'. Generally, the remote controller 100 comprises one gyro sensor 111 in a vertical direction and a horizontal direction, respectively.

The remote controller transmits the detected value to the display apparatus so that the display apparatus can acquire information on a speed, a position, etc. by processing the detected value. However, as shown in FIG. 3, it is general that a signal detected from the gyro sensor 111 is processed by a signal processor 121 of the control unit 120, and then is transmitted to the display apparatus. The signal processor 121 consists of a low pass filter (LPF) for removing a high frequency more than a predetermined frequency, an amplifier for amplifying a signal having passed through the LPF, and an analogue-digital converter for converting the amplified signal into a digital signal.

The acceleration sensor 112 measures an acceleration with respect to a gravitation (gravitational acceleration), a tilted degree with respect to the ground. More concretely, the more the remote controller 100 is tilted with respect to the ground, the larger the detected value of the acceleration sensor 112 is. Generally, the remote controller 100 detects its own motions in upper, lower, right and left directions by perpendicularly mounting a two-axis acceleration sensor on the ground. Here, the remote controller may be configured to detect an acceleration in each direction by using two or more one-axis acceleration sensors, or may be configured to detect an acceleration in a direction perpendicular to a screen of the display apparatus by using a three-axis acceleration sensor.

The remote controller transmits the detected value to the display apparatus so that the display apparatus can acquire information on a speed, a position, etc. by processing the detected value. However, as shown in FIG. 3, it is general that a signal detected from the acceleration sensor 112 is processed by a signal processor 121 of the control unit 120, and then is transmitted to the display apparatus. The signal processor 121 consists of a low pass filter (LPF) for removing a high frequency more than a predetermined frequency, an amplifier for amplifying a signal having passed through the LPF, and an analogue-digital converter for converting the amplified signal into a digital signal.

The control unit 120 includes a signal processor 121 configured to process a signal detected by the motion detection unit 110, and a controller 123 configured to drive the remote controller and to control each component. The controller 123 generates a control signal by demodulating a digital signal converted by the signal processor 121 according to a communication protocol, and transmits the control signal to the display apparatus through the communication unit 130.

The communication unit 130 of the remote controller 100 and the communication module 210 of the display apparatus 200 are connected to each other through wireless communications such as infrared rays and radio frequency (RF), or through wired communication lines.

Referring to FIG. 3, the remote controller according to the present invention further comprises a storage unit 140 configured to store driving programs for the remote controller, and control commands for a converting the image in correspondence to a motion of the remote controller. As the storage unit 140, a general memory may be used. Preferably, used is a non-volatile memory (NVM, NVRAM) capable of continuously maintaining stored information without power supplied thereto. The NVM includes a ROM, a flash memory, a magnetic computer memory device (e.g., hard disc, diskette drive, and a magnetic tape), an optical disc drive, etc. Here, the control unit 120 extracts a control command corresponding to the motion detected by the motion detection unit 110 among the control commands stored in the storage unit 140, and generates a control signal including the extracted control command.

Referring to FIG. 3, the remote controller according to the present invention further comprises an input unit 150 configured to directly receive a control command for controlling the display apparatus and the image from a user.

The input unit 150 may include various types of input means such as one or more buttons and a contact type pad. As shown in FIG. 1 or 4, the input unit 150 includes a mode conversion button 151 configured to allow the remote controller to enter an image conversion mode for performing a converting the image.

The remote controller enters an image conversion mode or returns to a previous mode by detecting a pressed state of the mode conversion button 151. For instance, the remote controller generates a control signal for entering an image conversion mode when the mode conversion button 151 is pressed once by a user, and generates a control signal for returning to a previous mode when the mode conversion button 151 is pressed once more by the user.

As another example, the remote controller 100 may be configured to generate a control signal when the mode conversion button 151 is in a pressed state. The control unit 120 generates a control signal when the mode conversion button 151 is in a pressed state, and transmits the control signal to the display apparatus 200 through the communication unit. Here, the image can be converted only when the mode conversion button 151 is in a pressed state.

As still another example, as shown in FIG. 4, when the remote controller 100 in a preset posture is moved, the control unit 120 generates a control signal and transmits the control signal to the display apparatus 200 through the communication unit 130. Referring to FIG. 4, when a user holds the remote controller 100 in an upright posture in a vertical direction, the remote controller 100 generates a control signal to perform a converting the image displayed on the display apparatus. Here, the remote controller may be configured to convert the image when being in a different posture.

The converting the image include at least one of enlargement, reduction, and rotation of the image based on a center point of the image, moving the center point, and scroll or drag of the image.

For instance, when the remote controller 100 moves upwardly or forwardly, the motion detection unit 110 detects the motion, and the control unit 120 generates a control signal for enlarging the image. And, the communication unit 130 transmits the control signal to the display apparatus so that the displayed image can be enlarged. On the contrary, when the remote controller 100 moves downwardly or backwardly, the motion detection unit 110 detects the motion, and the control unit 120 generates a control signal for reducing the image. And, the communication unit 130 transmits the control signal to the display apparatus so that the displayed image can be reduced. As another example, when the remote controller 100 is tilted to the left or right side, the display apparatus 200 rotates a displayed image to the left or right side.

When a user moves the remote controller, the user may have a limitation in moving his or her arm. In this case, as shown in FIG. 8, the user may move the remote controller 100 a plurality of times in a direction of 'A' or in a direction of 'B'. Here, ranges of enlargement, reduction, and rotation may be set according to the number of repeated frequencies.

Figure 9:
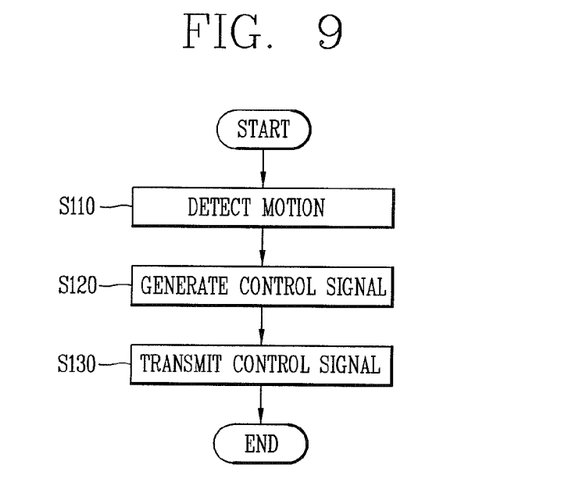
FIGS. 9 to 11 are flowcharts schematically showing a remote controlling method according to the present invention.

Referring to FIG. 9, a remote controlling method for remote-controlling an external display apparatus by using a remote controller comprises detecting a motion of the remote controller by the remote controller (S110), generating a control signal for converting an image displayed on the display apparatus based on the motion of the remote controller detected by the motion detection unit (S200), wherein the converting the image is zooming or rotating of the image, and transmitting the control signal to the display apparatus (S130). Detailed configurations of the components of the remote controller may be explained with reference to FIGS. 1 to 3.

The remote controller 100 detects its own motion by using one or more sensors mounted therein (S110). Said one or more sensors are implemented as at least one of one or more gyro sensors for detecting rotation of the remote controller 100, and one or more acceleration sensors for detecting acceleration of the remote controller 100. The gyro sensor is a type of angular speed sensor, which measures a rotation amount of the remote controller with an acceleration with respect to an axis. On the other hand, the acceleration sensor measures an acceleration with respect to a gravitation (gravitational acceleration), a tilted degree with respect to the ground.

The remote controller generates a control signal for converting an image displayed on the display apparatus in correspondence to the detected motion (S120), and transmits the control signal to the display apparatus (S130). Here, the converting the image include at least one of enlargement, reduction, and rotation of the image based on a center point of the image, moving the center point, and scroll or drag of the image. The remote controller 100 is provided with a button having a preset function, e.g., a mode conversion button, and enters an image conversion mode or returns to a previous mode by detecting a pressed state of the button. More concretely, when the button is pressed by a user, the remote controller 100 generates a control signal to convert an image displayed on the display apparatus by the display apparatus. When the mode conversion button 151 is pressed again by the user, the remote controller 100 returns to a previous mode. Here, the button may be an additional mode conversion button to enter an image conversion mode for converting an image. One or more buttons among preset buttons may be used.

The remote controller 100 detects a pressed state of the mode conversion button by a user (S110), generates a control signal to enter an image conversion mode for performing a converting the image, e.g., a zoom-in or zoom-out function (S120), and transmits the generated control signal (S130). On the other hand, when the mode conversion button 151 is pressed in the image conversion mode for performing a zoom-in or zoom-out function with respect to the image (S110), the remote controller 100 generates a control signal to get out of the image conversion mode (S120). Once a motion to enter an image conversion mode is detected (S110), the remote controller 100 generates a control signal to enter the image conversion mode (S120) and transmits the generated control signal to the display apparatus (S130). For instance, when the mode conversion button 151 is pressed in a normal mode, the remote controller generates a control signal to enter the image conversion mode for performing a zoom-in or zoom-out function with respect to an image. Here, the zoom-in or zoom-out corresponds to enlargement or reduction of an image on the basis of a specific position of the image. Accordingly, a center point and a range have to be determined. When the mode conversion button 151 is pressed, a point on a screen set by a posture, a position, etc. of the remote controller 100 is determined as a center point. Then, the remote controller performs a zoom-in or zoom-out function with respect to an image. For instance, the remote controller detects a motion to shake in right and left directions, a motion to shake in upper and lower directions, a motion to move in back and forth directions, a motion to rotate in right and left directions, etc. Based on the detected motion, the remote controller determines a range to zoom-in or zoom-out the image, i.e., an enlargement or reduction range. Here, the remote controller detects at least one of a speed, a distance and a direction thereof, determines whether to perform general control or minute control based on the detected information, and determines a range to enlarge or reduce the image. Here, a unit range corresponding to the speed, the distance and the direction may be pre-stored. Also, the remote controller 100 may control the range by repeating the motions. When the mode conversion button 151 is pressed once more while the remote controller 100 performs a converting the image, i.e., performs a zoom-in or zoom-out function, the remote controller 100 returns to a normal mode from the image conversion mode.

The remote controller 100 may be configured to generate a control signal when the mode conversion button is in a pressed state, and to transmit the control signal to the display apparatus 200. Here, the image can be converted only when the mode conversion button is in a pressed state. The remote controller 100 performs an image conversion process, e.g., a zoom-in or zoom-out function only when the mode conversion button is pressed by a user. Once the user's finger or hand is detached from the mode conversion button, the remote controller 100 generates a control signal to get out of the image conversion mode. That is, differently from the aforementioned method to enter an image conversion mode when the mode conversion button is pressed once, and to return to a normal mode when the mode conversion button is pressed once more, the image can be converted only when the mode conversion button 151 is in a continuously pressed state.

When the remote controller in a preset posture is moved, the remote controller 100 may generate a control signal and transmit the control signal to the display apparatus 200. Referring to FIG. 4, when a user holds the remote controller 100 in an upright posture in a vertical direction, the remote controller 100 may generate a control signal to perform a converting the image displayed on the display apparatus. When the remote controller 100 is held by the user in a preset posture, e.g., when the remote controller 100 is held by the user in an upright posture, the remote controller 100 generates a control signal to enter an image conversion mode for performing a converting the image, e.g., a zoom-in or zoom-out function with respect to an image. On the other hand, when the remote controller 100 is held by the user in a different posture or a previous posture, the remote controller 100 generates a control signal to get out of the image conversion mode. Once a preset posture, e.g., an upright posture of the remote controller 100 held by a user is detected (S110), the remote controller 100 generates a control signal to enter the image conversion mode (S120) and transmits the generated control signal to the display apparatus (S130). Here, the zoom-in or zoom-out corresponds to enlargement or reduction of an image on the basis of a specific position of the image. Accordingly, a center point and a range have to be determined. When the remote controller is in a preset posture, a center point of a screen corresponds to a center point of conversion. Then, the remote controller detects a zoom-in or zoom-out function with respect to an image. For instance, the remote controller detects a motion to shake in right and left directions, a motion to shake in upper and lower directions, a motion to move in back and forth directions, a motion to rotate in right and left directions, etc. (S110). Based on the detected motion, the remote controller determines a range to zoom-in or zoom-out the image, i.e., an enlargement or reduction range. Here, the remote controller detects at least one of a speed, a distance and a direction thereof, determines whether to perform general control or minute control based on the detected information, and determines a range to enlarge or reduce the image. Here, a unit range corresponding to the speed, the distance and the direction may be pre-stored. Also, the remote controller 100 may control the range by repeating the motions. When the remote controller is in a different posture or a previous posture while performing a converting the image, i.e., performs a zoom-in or zoom-out function, the remote controller 100 returns to a normal mode from the image conversion mode.

More concretely, if a specific button of the remote controller is pressed, or if the remote controller 100 is held in a specific posture in a state that a specific button has been pressed, the remote controller generates a control signal to perform a converting the image, and transmits the control signal to the display apparatus.

The remote controller detects its three-dimensional motion by combining at least one or two of a gyro sensor, an acceleration sensor, a terrestrial magnetic sensor and a distance sensor with each other (S110).

Figure 10:
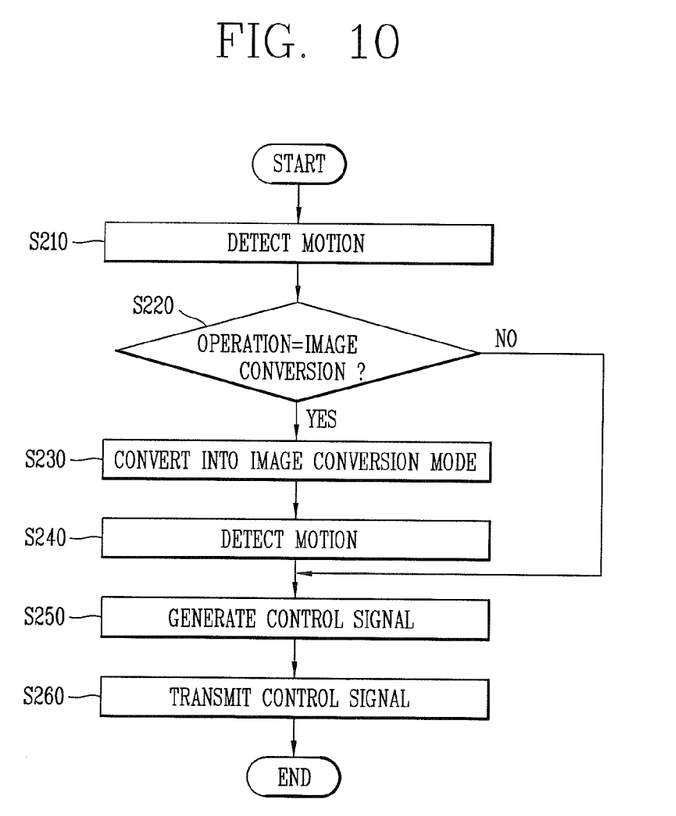

Referring to FIG. 10, the remote controlling method comprises converting a current mode into an image conversion mode for performing conversions displayed on a display apparatus (S230), detecting a motion of a remote controller (S240), and generating a control signal to convert an image displayed on the display apparatus in correspondence to the detected motion (S250), and transmitting the control signal to the display apparatus (S260). Detailed configurations of the components of the remote controller may be explained with reference to FIGS. 1 to 3.

The remote controller 100 detects its own motion by using one or more sensors mounted therein (S210). Said one or more sensors are implemented as at least one of one or more gyro sensors for detecting rotation of the remote controller 100, and one or more acceleration sensors for detecting acceleration of the remote controller 100. The gyro sensor is a type of angular speed sensor, which measures a rotation amount of the remote controller with an acceleration with respect to an axis. On the other hand, the acceleration sensor measures an acceleration with respect to a gravitation (gravitational acceleration), a tilted degree with respect to the ground.

The remote controller determines whether the detected motion is a motion to convert the image displayed on the display apparatus (S220). Here, the converting the image include at least one of enlargement, reduction, and rotation of the image based on a center point of the image, moving the center point, and scroll or drag of the image.

Firstly, the remote controller detects its own motion (S210), and determines whether the motion is a motion which requests for a preset conversion process (S220). For instance, converting a current mode into an image conversion mode (S230) includes detecting a pressed state of a mode conversion button provided at the remote controller (not shown), and entering an image conversion mode or a previous mode according to a pressed state of the mode conversion button (not shown). As another example, the converting a current mode into an image conversion mode (S230) is performed only when the mode conversion button is in a continuously pressed state. As still another example, the converting a current mode into an image conversion mode (S230) includes determining whether the remote controller in a preset posture is moved (not shown). If the remote controller in a preset posture is moved, a current mode is converted into an image conversion mode.

More concretely, if a specific button of the remote controller is pressed, or if the remote controller 100 is held in a specific posture in a state that a specific button has been pressed, the remote controller makes the display apparatus enter an image conversion mode for performing a converting the image (S230). Here, the display apparatus may be made to enter the image conversion mode in a different manner.

After being converted into the image conversion mode, the remote controller 100 detects its own motion by using one or more sensors mounted therein (S240). For instance, when the remote controller 100 moves upwardly or forwardly, the remote controller generates a control signal for enlarging the image (S250) and transmits the control signal to the display apparatus so that the displayed image can be enlarged (S260). On the contrary, when the remote controller 100 moves downwardly or backwardly, the remote controller generates a control signal for reducing the image (S250) and transmits the control signal to the display apparatus so that the displayed image can be reduced (S260). As another example, when the remote controller 100 is tilted to the left or right side, the display apparatus 200 rotates a displayed image to the left or right side.

Hereinafter, a case of using a specific button (mode conversion button) will be explained. The remote controller 100 detects a pressed state of the mode conversion button by a user (S210), generates a control signal to enter an image conversion mode for performing a converting the image, e.g., a zoom-in or zoom-out function with respect to an image, and transmits the generated control signal (S230). On the other hand, when the mode conversion button 151 is pressed in the mode for performing a zoom-in or zoom-out function with respect to the image (S210), the remote controller 100 generates a control signal to get out of the image conversion mode. Once a motion to enter an image conversion mode is detected (S220), the remote controller 100 generates a control signal to enter the image conversion mode and transmits the generated control signal to the display apparatus. For instance, when the mode conversion button 151 is pressed in a normal mode, the remote controller generates a control signal to enter the image conversion mode for performing a zoom-in or zoom-out function with respect to an image. Here, the zoom-in or zoom-out corresponds to enlargement or reduction of an image on the basis of a specific position of the image. Accordingly, a center point and a range have to be determined. When the mode conversion button 151 is pressed, a point on a screen set by a posture, a position, etc. of the remote controller 100 is determined as a center point.

Then, the remote controller detects a zoom-in or zoom-out function with respect to an image. For instance, the remote controller detects a motion to shake in right and left directions, a motion to shake in upper and lower directions, a motion to move in back and forth directions, a motion to rotate in right and left directions, etc. (S240). The remote controller generates a control signal according to the detected motion (S250), and transmits the generated control signal to the display apparatus (S260). Based on the detected motion, the remote controller determines a range to zoom-in or zoom-out the image, i.e., an enlargement or reduction range. Here, the remote controller detects at least one of a speed, a distance and a direction thereof, determines whether to perform general control or minute control based on the detected information, and determines a range to enlarge or reduce the image. Here, a unit range corresponding to the speed, the distance and the direction may be pre-stored. Also, the remote controller 100 may control the range by repeating the motions. When the mode conversion button 151 is pressed once more while the remote controller 100 performs a converting the image, i.e., performs a zoom-in or zoom-out function, the remote controller 100 returns to a normal mode from the image conversion mode. As another example, the remote controller 100 may perform an image conversion process, e.g., a zoom-in or zoom-out function only when the mode conversion button 151 is pressed by a user. Once the user's finger or hand is detached from the mode conversion button, the remote controller 100 may generate a control signal to get out of the image conversion mode. That is, differently from the aforementioned method to enter an image conversion mode when the mode conversion button is pressed once, and to return to a normal mode when the mode conversion button is pressed once more, the image can be converted only when the mode conversion button 151 is in a continuously pressed state.

As still another example, when the remote controller 100 is in a preset posture, i.e., when the remote controller 100 is held by a user in an upright state (S210), the remote controller 100 generates a control signal to perform a converting the image displayed on the display apparatus. Then, the remote controller 100 transmits the generated control signal to the display apparatus (S230). On the other hand, when the remote controller 100 is held by the user in a different posture or a previous posture, the remote controller 100 generates a control signal to get out of the image conversion mode. Once a preset posture, e.g., an upright posture of the remote controller has been detected (S220), the remote controller generates a control signal to enter an image conversion mode, and transmits this generated control signal to the display apparatus so that the display apparatus can perform a converting the image. Here, the zoom-in or zoom-out corresponds to enlargement or reduction of an image on the basis of a specific position of the image. Accordingly, a center point and a range have to be determined. When the remote controller 100 is in a preset posture, a center point of a screen corresponds to a center point of conversion. Then, the motion detection unit 110 detects a zoom-in or zoom-out function (S240). For instance, the remote controller detects a motion to shake in right and left directions, a motion to shake in upper and lower directions, a motion to move in back and forth directions, a motion to rotate in right and left directions, etc. Then, the remote controller extracts a corresponding control command to generate a control signal (S250), and transmits the generated control signal to the display apparatus (S260). Based on the detected motion, the remote controller determines a range to zoom-in or zoom-out the image, i.e., an enlargement or reduction range. Here, the remote controller detects at least one of a speed, a distance and a direction thereof, determines whether to perform general control or minute control based on the detected information, and determines a range to enlarge or reduce the image. Here, a unit range corresponding to the speed, the distance and the direction may be pre-stored. Also, the remote controller 100 may control the range by repeating the motions. When the remote controller 100 is in a different posture or a previous posture while performing a converting the image, e.g., a zoom-in or out function, the remote controller 100 returns to a normal mode from the image conversion mode.

The remote controller detects its three-dimensional motion by combining at least one or two of a gyro sensor, an acceleration sensor, a terrestrial magnetic sensor and a distance sensor with each other (S210, S240).

Figure 11:
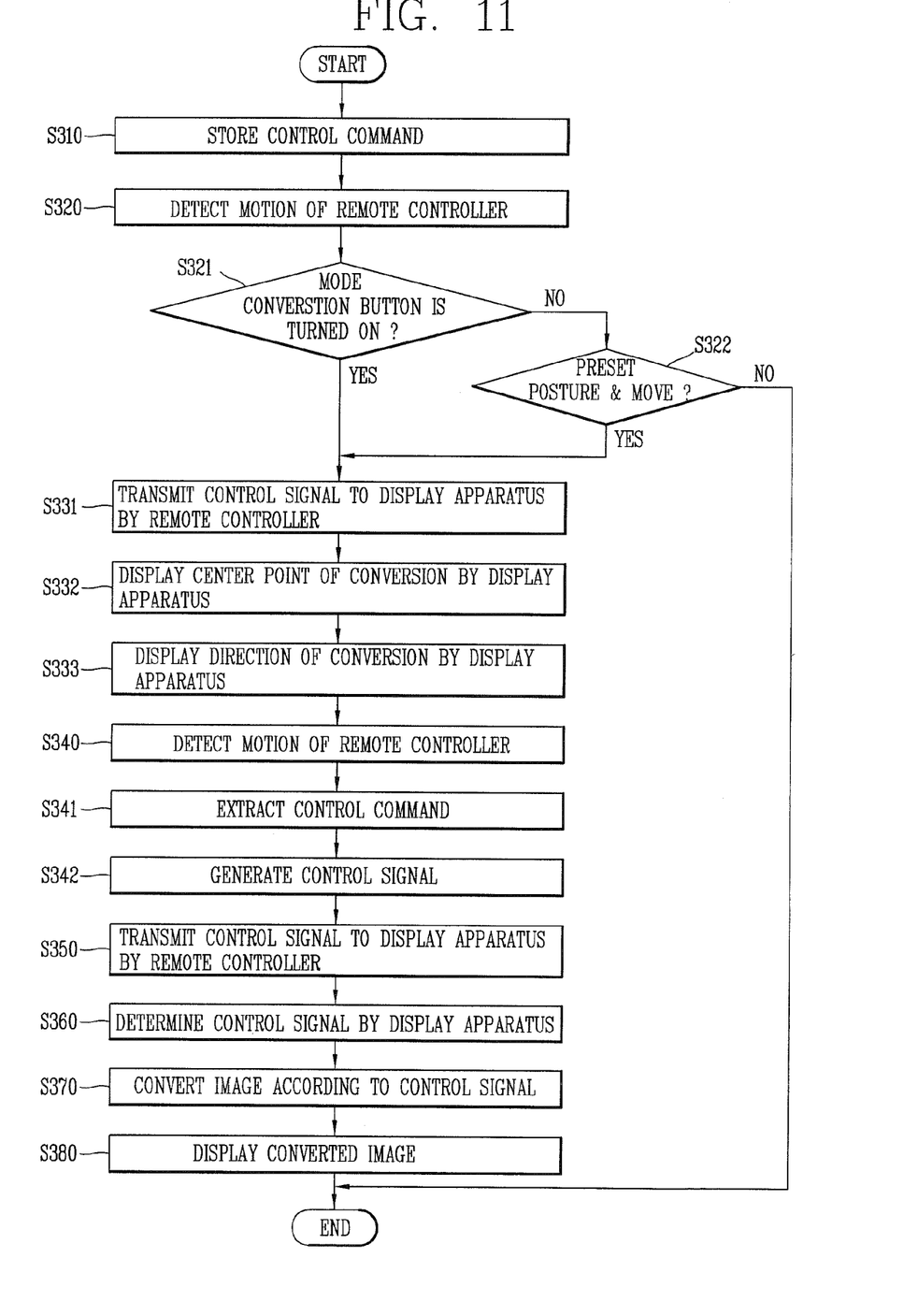

Referring to FIG. 11, a remote controlling method comprises detecting a motion of the remote controller (S320), converting a current mode into an image conversion mode for performing a converting the image displayed on a display apparatus (S330), detecting a motion of the remote controller (S340), generating a control signal for converting an image displayed on the display apparatus in correspondence to the detected motion (S342), and transmitting the control signal to the display apparatus (S350).

Referring to FIG. 11, the remote controlling method according to the present invention further comprises determining the control signal by the display apparatus (S360), converting an image based on the control signal by the display apparatus (S370), and displaying the converted image by the display apparatus (S380). Detailed configurations of the components of the remote controller may be explained with reference to FIGS. 1 to 3.

The converting a current mode into an image conversion mode (S330) includes determining whether the motion detected in S320 is a preset motion for performing a converting the image. That is, the converting a current mode into an image conversion mode (S330) includes detecting a pressed state of a mode conversion button provided at the remote controller (S321), and entering an image conversion mode or a previous mode according to a pressed state of the mode conversion button. As another example, the converting a current mode into an image conversion mode and generating a control signal may be performed only when the mode conversion button is in a continuously pressed state. As still another example, the converting a current mode into an image conversion mode (S330) includes determining whether the remote controller in a preset posture is moved (S322). If the remote controller in a preset posture is moved, a current mode is converted into an image conversion mode.

The converting a current mode into an image conversion mode (S330) further comprises generating a control signal to display a center point of the converting the image on the display apparatus (S331), and transmitting the control signal to the display apparatus (not shown). The display apparatus displays a center point of the converting the image according to the received control signal (S332).

The converting a current mode into an image conversion mode (S330) comprises generating a second control signal to display directions of the converting the image on the display apparatus (S331), and transmitting the second control signal to the display apparatus (not shown). The display apparatus displays directions of the converting the image according to the received second control signal (S333).

Referring to FIG. 11, the remote controlling method further comprises storing control commands for a converting the image in correspondence to the motion (S310). The generating a control signal (S342) includes extracting a control command corresponding to the detected motion among the control commands for a converting the image (S341), and generating a control signal including the extracted control command.

The remote controller 100 detects its own motion by using one or more sensors mounted therein (S320). Said one or more sensors are implemented as at least one of one or more gyro sensors for detecting rotation of the remote controller 100, and one or more acceleration sensors for detecting acceleration of the remote controller 100. The gyro sensor is a type of angular speed sensor, which measures a rotation amount of the remote controller with an acceleration with respect to an axis. On the other hand, the acceleration sensor measures an acceleration with respect to a gravitation (gravitational acceleration), a tilted angle with respect to the ground.

The remote controller determines whether the detected motion is a motion to convert an image displayed on the display apparatus (S330). Here, the converting the image include at least one of enlargement, reduction, and rotation of the image based on a center point of the image, moving the center point, and scroll or drag of the image. If a specific button of the remote controller is pressed (S321) or if the remote controller 100 is held in a specific posture in a state that a specific button has been pressed (S322), the remote controller makes the display apparatus enter an image conversion mode for performing a converting the image. Here, the display apparatus may be made to enter the image conversion mode in a different manner.

Once the remote controller 100 transmits, to the display apparatus 200, a control signal to enter an image conversion mode for performing a converting the image (S331), the display apparatus 200 reads a control command from the control signal (S332), and displays a center point or a direction of a converting the image according to the control command, or displays the center point and the direction together (S333). Once the display apparatus 200 enters an image conversion mode by a user or a control signal of the remote controller 100, the display apparatus 200 displays a center point for a converting the image on a screen (S332). Referring to FIGS. 5 to 7, the center point for a converting the image may be an arbitrary point, a center point of the screen, or a point where a cursor is located, etc. In case of performing a converting the image by pressing a specific button of the remote controller 100 by a user or in a state that the specific button has been pressed, the display apparatus 200 displays, on the screen, a point preset by a posture, a position, etc. of the remote controller 100 as a center point 200a as shown in FIG. 5. When the remote controller 100 is held by a user in a preset posture, the display apparatus 200 displays a center point on the center of the screen as shown in FIG. 6. Here, the position of the center point corresponds to a position of a cursor. As shown in FIGS. 5 to 7, the display apparatus 200 further displays directions of enlargement, reduction and rotation on the screen by using an arrow, etc. (S333).

After being converted into the image conversion mode, the remote controller 100 re-detects its own motion by using one or more sensors mounted therein (S340). Then, the remote controller 100 generates a control signal including a control command for converting an image, from a signal detected from the sensors mounted therein (S342), and then transmits the generated control signal to the display apparatus 200 (S350). In case of storing control commands preset with respect to specific motions (S310), the remote controller extracts a control command corresponding to a detected motion among the stored control commands (S341). Then, the remote controller generates a control signal including the extracted control command (S342). The display apparatus 200 reads a control command from the control signal, converts the image according to the control command, and displays the converted image (S360~S380). For instance, when the remote controller 100 moves upwardly or forwardly, the display apparatus 200 enlarges a displayed image. On the contrary, when the remote controller 100 moves downwardly or backwardly, the display apparatus 200 reduces a displayed image. As another example, when the remote controller 100 is tilted to the left or right side, the display apparatus 200 rotates a displayed image to the left or right side. When a user moves the remote controller, the user may have a limitation in moving his or her arm. In this case, as shown in FIG. 8, the user may move the remote controller 100 a plurality of times in a direction of 'A' or in a direction of 'B'. Here, ranges of enlargement, reduction, and rotation may be set according to the number of repeated frequencies.

The remote controller detects its three-dimensional motion by combining at least one or two of a gyro sensor, an acceleration sensor, a terrestrial magnetic sensor and a distance sensor with each other (S320, S340).

As aforementioned, in the remote controller, the remote controlling method, and the display system having the same according to the present invention, a converting the image may be performed by using one remote controller, without implementing a touch screen on the display apparatus or using two or more remote controllers for multi-touch. This may reduce fabrication costs and enhance a user's convenience.

The invention claimed is:

1. A display system, comprising:
a display apparatus and a remote controller,
wherein the remote controller is configured to:
generate, via a control unit of the remote controller, a control signal for entering an image conversion mode for performing converting an image displayed on the display apparatus when a motion of the remote controller, detected by a motion detection unit of the remote controller, corresponds to a preset first posture, wherein the motion detection unit comprises one or more sensors; and
transmit, via a communication unit of the remote controller, the control signal for entering the image conversion mode to the display apparatus, and
wherein the display apparatus is configured to:
enter the image conversion mode in response to the control signal for entering the image conversion mode being received from the remote controller,
wherein the image conversion mode is entered based on that the motion of the remote controller corresponds to the preset first posture;
receive a control signal for converting the image from the remote controller,
wherein the control unit of the remote controller generates the control signal for converting the image in response to a motion of the remote controller;
convert the image based on the received control signal for converting the image corresponding to the detected motion, wherein the image is enlarged, reduced or rotated based on the motion of the remote controller; and
release the image conversion mode based on a motion of the remote controller corresponding to a preset second posture detected by the motion detection unit of the remote controller,
wherein the image is enlarged, reduced or rotated on a basis of a center point in the image conversion mode, and
wherein the center point of the image converted has a different position according to whether the remote controller points a specific position and the remote controller is in a specific posture as a motion of the remote controller for entering the image conversion mode.

2. The display system of claim 1, wherein the motion detection unit comprises at least one of one or more gyro sensors for detecting rotation of the remote controller, one or more acceleration sensors for detecting acceleration of the remote controller, one or more terrestrial magnetic sensors, and one or more distance sensors.

3. The display system of claim 2, wherein the motion detection unit detects a three-dimensional motion of the remote controller by combining at least one or two of the gyro sensors, the acceleration sensors, the terrestrial magnetic sensors and the distance sensors with each other.

4. The display system of claim 1, wherein the display apparatus extracts a control command from the control signal for converting the image, and displays the center point of the image converted according to the control command.

5. The display system of claim 1, wherein the motion detection unit detects a three-dimensional motion of the remote controller by combining at least one or two of a gyro sensor, an acceleration sensor, a terrestrial magnetic sensor and a distance sensor with each other.

6. A method for converting an image in a display system including a remote controller and a display apparatus, comprising:
generating, via a control unit of the remote controller, a control signal for entering an image conversion mode for performing converting an image displayed on the display apparatus when a motion of the remote controller, detected by a motion detection unit of the remote controller, corresponds to a preset first posture, wherein the motion detection unit comprises one or more sensors;
transmitting, via a communication unit of the remote controller, the control signal for entering the image conversion mode to the display apparatus;
entering the image conversion mode in the display apparatus in response to the control signal received from the remote controller, wherein the image conversion mode is entered based on the motion of the remote controller corresponding to the preset first posture;
receiving, a control signal for converting the image from the remote controller,
wherein the control unit of the remote controller generates the control signal for converting the image in response to a motion of the remote controller; and
converting the image based on the received control signal for converting the image corresponding to the detected motion, wherein the image is enlarged, reduced or rotated based on the motion of the remote controller; and
releasing the image conversion mode based on a motion of the remote controller corresponding to a preset second posture detected by the motion detection unit of the remote controller,
wherein the image is enlarged, reduced or rotated on a basis of a center point in the image conversion mode, and
wherein the center point of the image converted has a different position according to whether the remote controller points a specific position and the remote controller is in a specific posture as a motion of the remote controller for entering the image conversion mode.

7. The method of claim 6, wherein the motion detection unit comprises at least one of one or more gyro sensors for detecting rotation of the remote controller, one or more acceleration sensors for detecting acceleration of the remote controller, one or more terrestrial magnetic sensors, and one or more distance sensors.

8. The method of claim 7, wherein the motion detection unit detects a three-dimensional motion of the remote controller by combining at least one or two of the gyro sensors, the acceleration sensors, the terrestrial magnetic sensors and the distance sensors with each other.

9. The method of claim 6, wherein the motion detection unit detects a three-dimensional motion of the remote controller by combining at least one or two of a gyro sensor, an acceleration sensor, a terrestrial magnetic sensor and a distance sensor with each other.

* * * * *